United States Patent
Dileo

[19]

[11] Patent Number: 5,815,234
[45] Date of Patent: Sep. 29, 1998

[54] APPARATUS AND METHOD FOR VIEWING A SURFACE THROUGH A MIRROR

[76] Inventor: Frank Dileo, P.O. Box 1668, Bridgehampton, N.Y. 11932

[21] Appl. No.: 813,216

[22] Filed: Mar. 7, 1997

[51] Int. Cl.⁶ ................................................. G02C 9/02
[52] U.S. Cl. ................................................. 351/59
[58] Field of Search ........................... 351/41, 59, 159, 351/169

[56] References Cited

U.S. PATENT DOCUMENTS

3,495,898  2/1970  Vecchio ..................................... 351/59
3,840,294  10/1974 Knier ........................................ 351/59
5,452,030  9/1995  Feinbloom ............................... 351/175
5,561,481  10/1996 Dileo et al. ............................... 351/59

Primary Examiner—Huy Mai
Attorney, Agent, or Firm—Jerome D. Jackson

[57] ABSTRACT

A frame assembly for applying makeup to presbyopic eyes. The assembly includes a single prismatic lens that rotates between a position in optical registry with the wearer's left eye and another position in optical registry with the wearer's right eye.

26 Claims, 6 Drawing Sheets

Fig. 9

APPARATUS AND METHOD FOR VIEWING A SURFACE THROUGH A MIRROR

BACKGROUND OF THE INVENTION

1. Field of the Invention

This invention relates generally to an apparatus and method for viewing a surface through a mirror, and, more particularly, to an apparatus and method for viewing the face while applying substances, such as makeup, to areas around the eyes.

2. Description of Related Art

The human vision system includes a sophisticated interrelation between the eyes, the brain, and extraocular muscles that effect eye movement. The vision system is optimized for viewing objects that are at least a certain distance from the viewer's face. For closer objects, the system sometimes delivers an image that is less than optimal.

Viewing closer objects can be especially challenging for persons having presbyopia or refractive error. Placement of makeup by such persons can result in misapplication of the makeup and the risk of poking the eye and scratching the cornea. Such persons typically use a magnifying mirror and bright light to apply makeup.

SUMMARY OF THE INVENTION

It an object of the present invention to provide an apparatus and method for viewing the face at close distances.

It is another object of the present invention to provide an apparatus and method for viewing the face at close distances, while reducing eye strain.

It is still another object of the present invention to provide a method and apparatus for using both eyes to view an area of the face at close distances, thereby providing depth perception to the viewer.

It is still another object of the present invention to provide a portable apparatus and method for viewing the face while applying compositions, such as make-up or contact lenses.

To achieve these and other objects of the present invention, a frame assembly configured to allow a person to view the face through a mirror, the face having a nose delineating a first face half with a first eye, and a second face half with a second eye, the frame assembly comprises a support; means for securing the support to the head of the person; and an optical element for bending light, reflected from the second face half and the mirror, toward an angle normal to the mirror onto the fovea of the first eye, wherein the optical element is coupled to the support allowing movement of the optical element from a first position in optical registration with the first eye and a second position out of optical registration with the first eye.

According to another aspect of the present invention, a method for applying a substance to a face having a nose delineating a first face half with a first eye, and a second face half with a second eye, the method comprises the steps of positioning the face in front of a mirror; reflecting light, from the second half of the face and the mirror to produce reflected light, the reflected light having an angle N relative to the an angle normal to the mirror; bending the reflected light to produce bent light having an angle no more than 0.5N relative to the angle normal to the mirror; viewing the bent light with the first eye; and applying the substance to an area of the face in proximity to the second eye.

The accompanying drawings which are incorporated in and which constitute a part of this specification, illustrate embodiments of the invention and, together with the description, explain the principles of the invention, and additional advantages thereof.

DESCRIPTION OF THE PREFERRED EMBODIMENT

Figure 1:
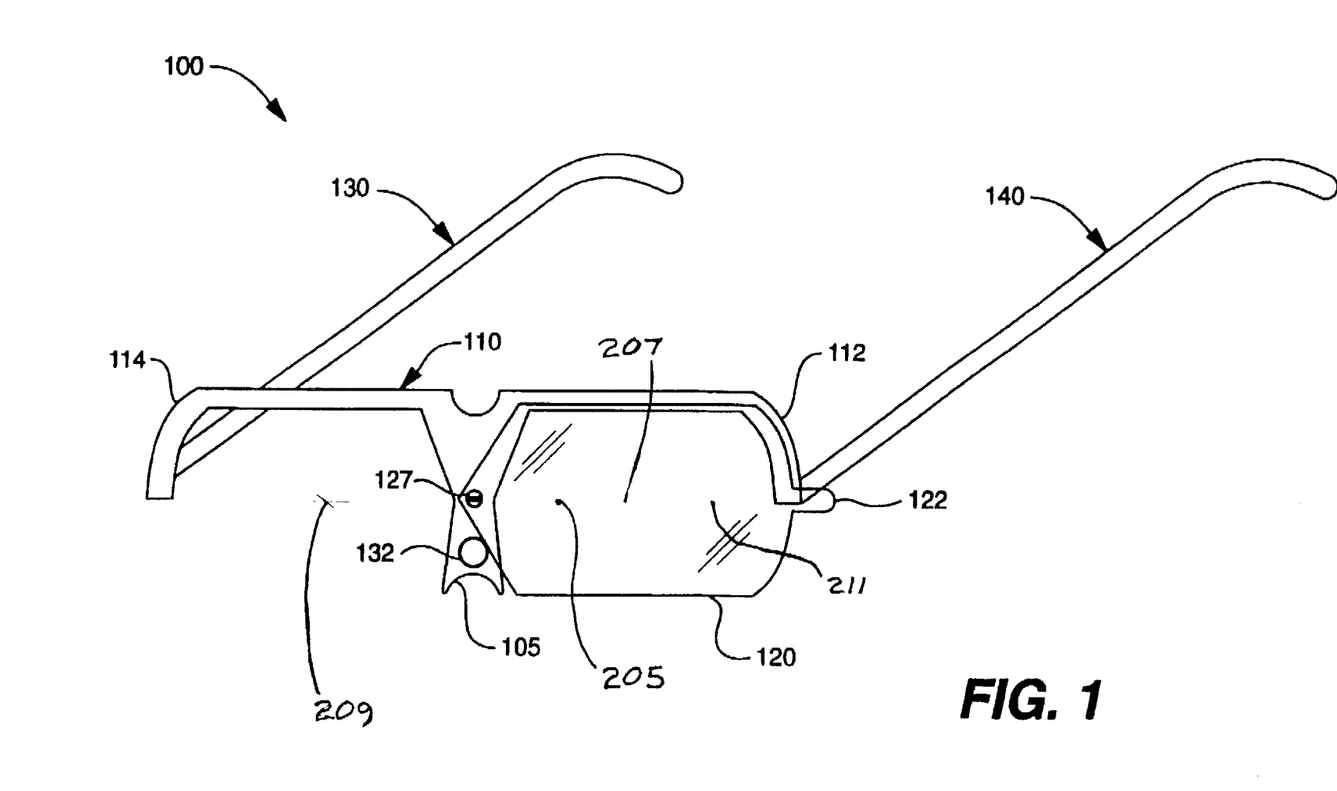
FIG. 1 is a perspective view of an eye glass frame assembly configured to bend and magnify an image of the right side of the face, for viewing with the left eye, according to the preferred embodiment of the present invention.

FIG. 1 shows frame assembly 100 in perspective, according to the preferred embodiment of the invention. Assembly 100 includes lens 120. Lens 120 has a maximum thickness at lens portion 205. Lens portion 205 is between the center of the frame assembly, defined by screw 127, and center location 207 in left eye frame 112. Lens portion 205 is approximately 6 to 8 millimeters thick.

Lens 120 has a tapered thin portion 211 between center portion 207 and handle projection 122. Section 211 has a thickness of approximately 1 millimeter.

In FIG. 1, lens 120 is a prism configured to bend light reflected from the right side of the face and a mirror (not shown in FIG. 1) to produce bent light have a direction substantially normal to both left eye frame 112 and the surface of the mirror, thereby conditioning an image for the left eye. As described in more detail below, lens 120 has a convex shape resulting in a positive power diopter, meaning that frame assembly 100 is configured to bend and magnify an image of the right side of the face, for viewing with the left eye. Because there is no lens in front of the right eye, the facial area proximate the right eye is relatively unobstructed, allowing easy application of makeup.

Frame assembly 100 includes horizontal support 110 having a left eye frame 112 and a right eye frame 114. Screw 127 extends out of horizontal support 110 and through a hole in lens 120. Screw 127 acts as an axel about which lens 120 rotates, meaning that lens 120 is rotatably coupled to horizontal support 110 by screw 127. Lens 120 abuts lens resting block 132, which limits the rotation range of lens 120. Lens rest 132 is in vertical alignment with screw 127.

Figure 2:
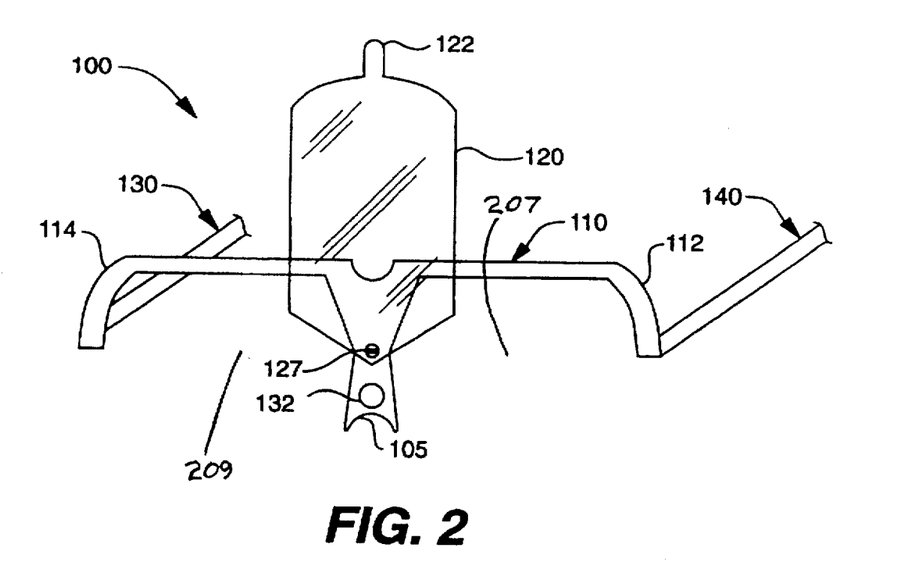
FIG. 2 is a perspective view illustrating a change in configuration of the preferred frame assembly.

FIG. 2 shows frame assembly 100 while changing configuration by rotating lens 120 in a vertical plane. Because the user looks through lens 120 in a common direction, regardless of whether lens 120 is in left eye frame 112 or right eye frame 114, lens 120 may be asymmetrical, as discussed below.

Arm 140 is coupled to a downward-extending part of the left eye frame 112. Arm 130 is coupled to a downward-extending part of the right frame 114. Arms 130 and 140 act to secure support 110 to the head of a person. Because of these couplings of arms 130 and 140, frame assembly 100 tends to sit high on the wearer's face, allowing lens 120 to clear the wearer's forehead when lens 120 rotates. Thus, frame assembly 100 need not be removed when lens 120 rotates between positions.

Figure 3:
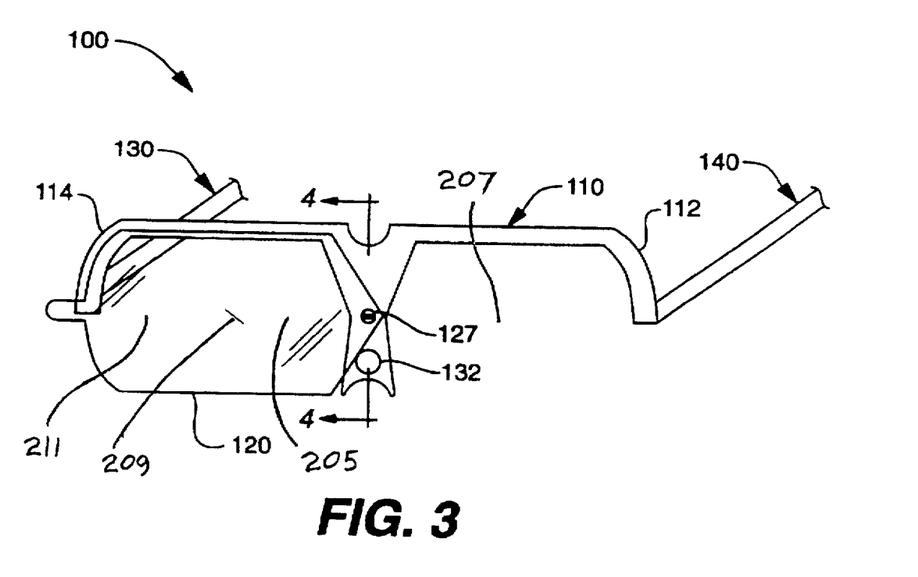
FIG. 3 is a perspective view of the preferred frame assembly configured to bend and magnify an image of the left side of the face, for viewing with the right eye.

In FIG. 3, lens 120 is a prism configured to bend light reflected from the left side of the face and a mirror (not shown in FIG. 3) to produce bent light have a direction substantially normal to both right eye frame 114 and the surface of the mirror, thereby conditioning an image for the right eye. Because lens 120 has a convex shape resulting in a positive power diopter, frame assembly 100 is configured to bend and magnify an image of the left side of the face, for viewing with the right eye. Because there is no lens in front of the left eye, the facial area proximate the left eye is relatively unobstructed, allowing easy application of makeup.

Thus, frame assembly 100 includes a horizontal support 110 including a left eye frame 112 and a right eye frame 114. Horizontal support 110 defines the top of frame assembly 100. Horizontal support 110 extends along the top of the frame assembly 100 only, allowing unobstructed access to the eyes from below. Lens 120 is rotatably coupled to the horizontal support 110, allowing rotation in a vertical plane between a first position in the left eye frame 112 and a second position in the right eye frame 114. Thus, lens 120 rotates between a position in optical registry with the wearer's left eye and another position in optical registry with the wearer's right eye.

Figure 4:
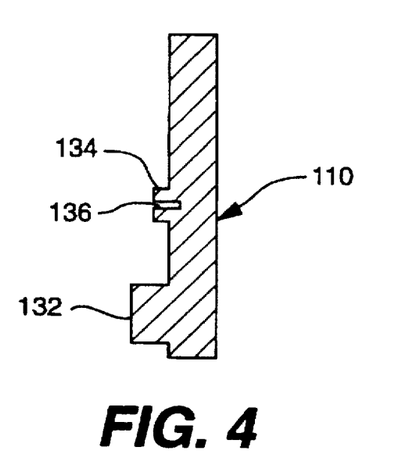
FIG. 4 is a section view of part of the preferred frame assembly, taken along the line 4—4 shown in FIG. 3.

FIG. 4 shows a view of horizontal support 110, taken along the line 4—4 shown in FIG. 3. Shim block 134 supports lens 120, displacing lens 120 away from horizontal support 110. Screw hole 136 has threads that mate with threads on screw 127. Resting block 132 limits the rotation range of lens 120.

Figure 5:
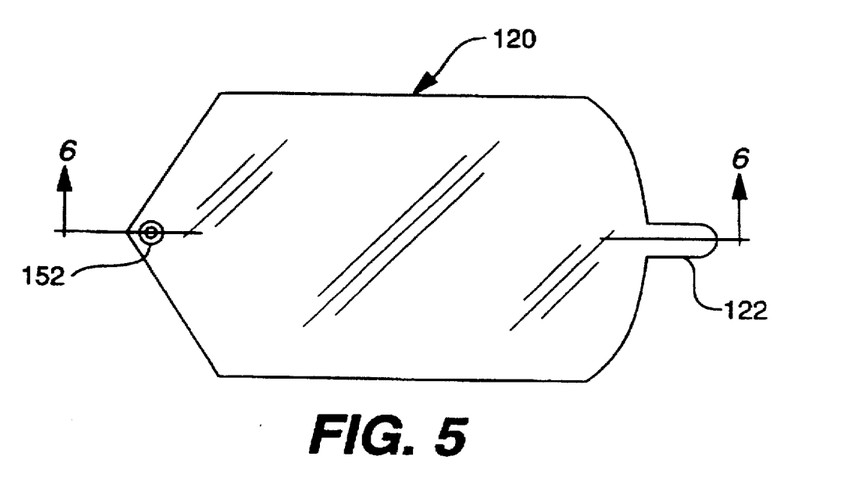
Fig. 5 is a plan view of the lens of the preferred frame assembly.

FIG. 5 shows lens 120 including handle projection 122 integrally formed with lens 120. In other words, lens 120 includes an optical material defining a handle projection 122. Lens 120 also defines a recess 152 having a width slightly greater than the width of the head of screw 127.

Figure 6:
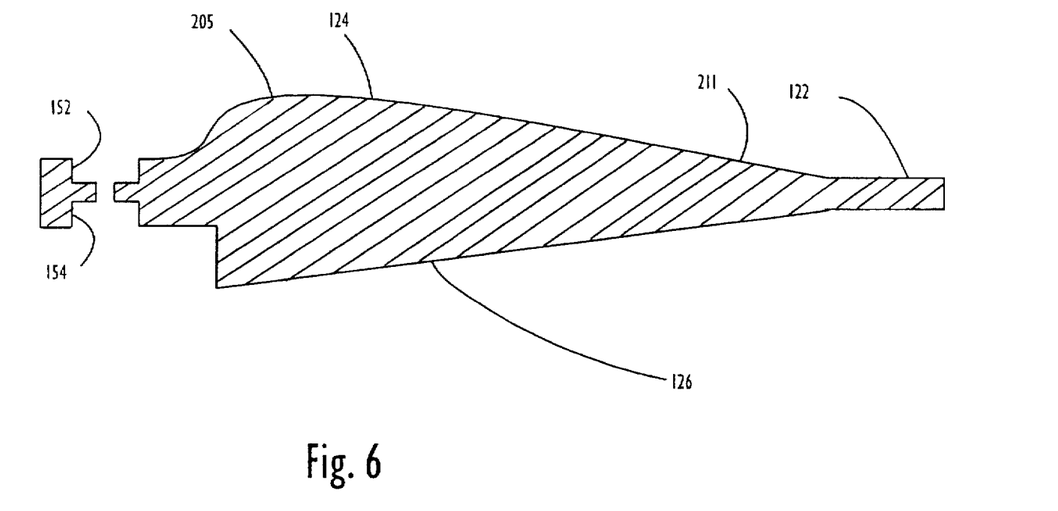
FIG. 6 is a view of the lens of the preferred frame assembly, taken along the line 6—6 shown in FIG. 5.

FIG. 6 shows a side view of lens 120 taken along the line 6—6 shown in FIG. 5. Lens 120 defines a recess 154 having a width slightly greater than the width of shim block 134. Lens 120 is symmetrical about a horizontal axis in the plane of the paper of FIG. 6.

Lens 120 has a prism diopter of at least 4. Preferably, lens 120 has a prism diopter in the range 6 to 8. Lens 120 has a power diopter between +0.50 and +9.00 diopters. Lens 120 has a maximum thickness of 6 to 8 millimeters at lens portion 205. In the left frame position, shown in FIGS. 1 and 8, lens portion 205 is offset from the center 207 of the left eye frame 112. In the right eye frame position, shown in FIGS. 3 and 9, lens portion 205 is offset from center 209 of frame 114.

Convex face 124 and recess 152 are on one side of lens 120, and planar face 126 and recess 154 are on the other side of lens 120.

Figure 7:
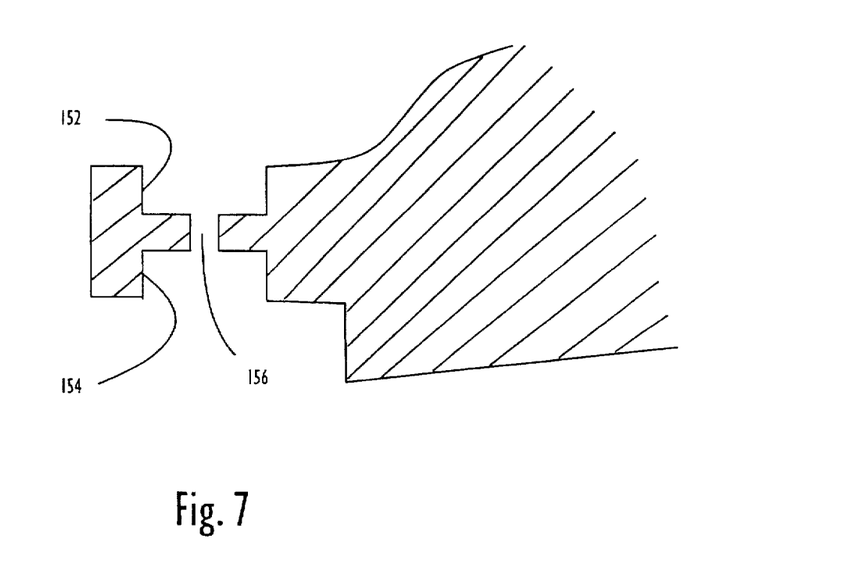
FIG. 7 is a further enlarged view of the lens shown in FIG. 6.

FIG. 7 shows a further enlarged view of the pivot area of lens 120 including recess 152, recess 154, and through hole 156. When frame assembly 100 is complete, as shown in FIGS. 1–3, through hole 156 encompasses a smooth, unthreaded, portion of screw 127.

Figure 8:
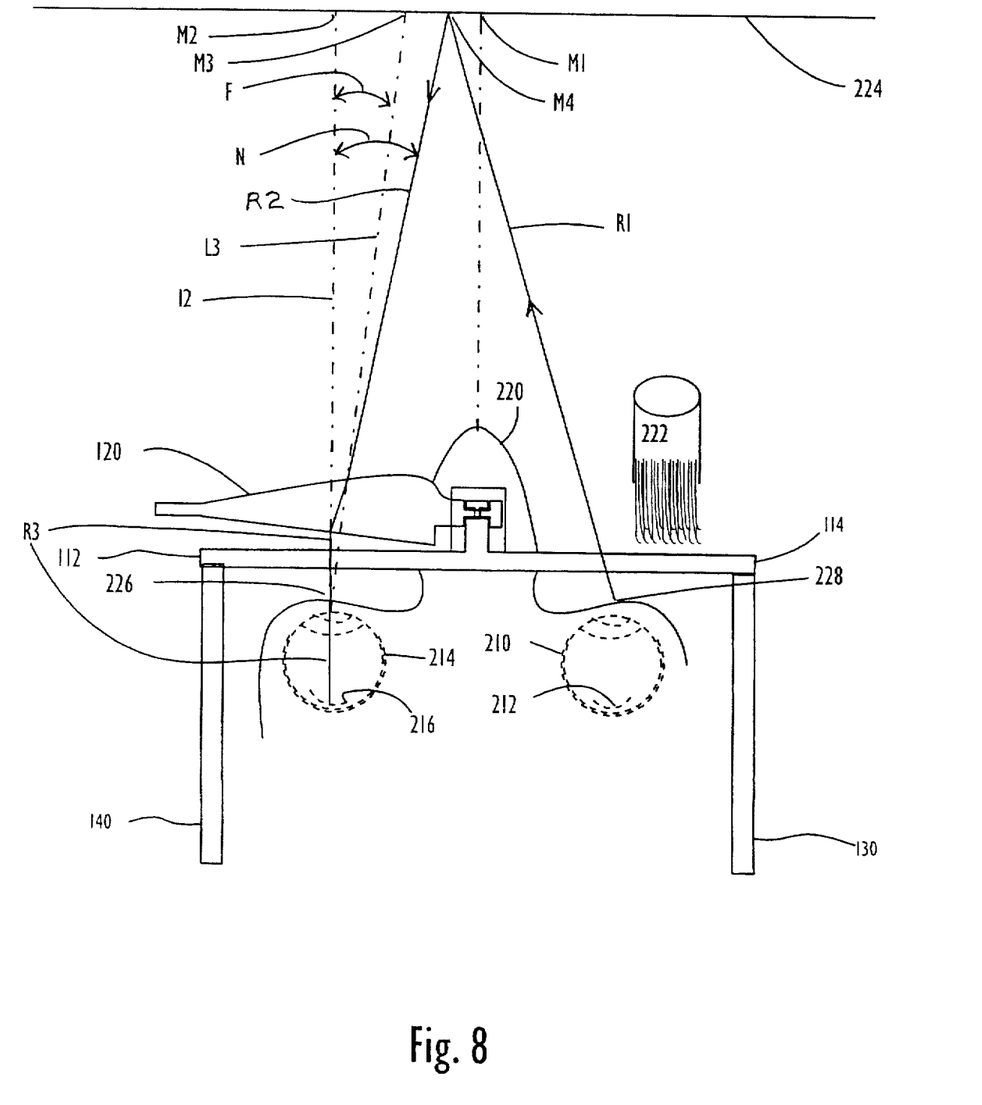
FIG. 8 is a top plan view showing the preferred frame assembly in use for bending and magnifying an image of the right side of the face, for viewing with the left eye.

FIG. 8 shows frame assembly 100 in use while the wearer applies makeup to facial area 228, directly under right eye 210, using mascara brush 222. The wearer places lens 120 in left eye frame 112 to observe the right side of the face through mirror 224 while looking through left eye 214. In FIG. 8, the wearers's face is approximately one half (0.5) meters from mirror 224. Light ray portion R1, reflected from facial area 228 travels to mirror 224 and a resulting ray portion R2 reflects from mirror 224 onto lens 120. Lens 120 bends ray portion R2 resulting in ray portion R3 which is incident on fovea 216 of the left eye. Ray portion R3 is substantially normal to the surface of mirror 224, and is substantially normal to left frame 112.

In FIG. 8, because lens 120 has a substantial prism diopter power, frame assembly 100 is configured to bend light from the right side of the face, toward an angle normal to left eye frame 112, onto fovea 216 of the wearer's eye 214. In other words, frame assembly 100 is configured to allow a person to view a face having a nose 220 delineating a first face half with an eye 214, and a second face half with an eye 210. Lens 120 acts as an optical element for bending light, reflected from the second face half and 224, toward an angle normal to mirror 224 onto fovea 216 of left eye 214.

Subsequently, the wearer rotates lens 120 in the vertical plane, to a position out of optical registration with left eye 214 and in optical registration with right eye 210.

Figure 9:
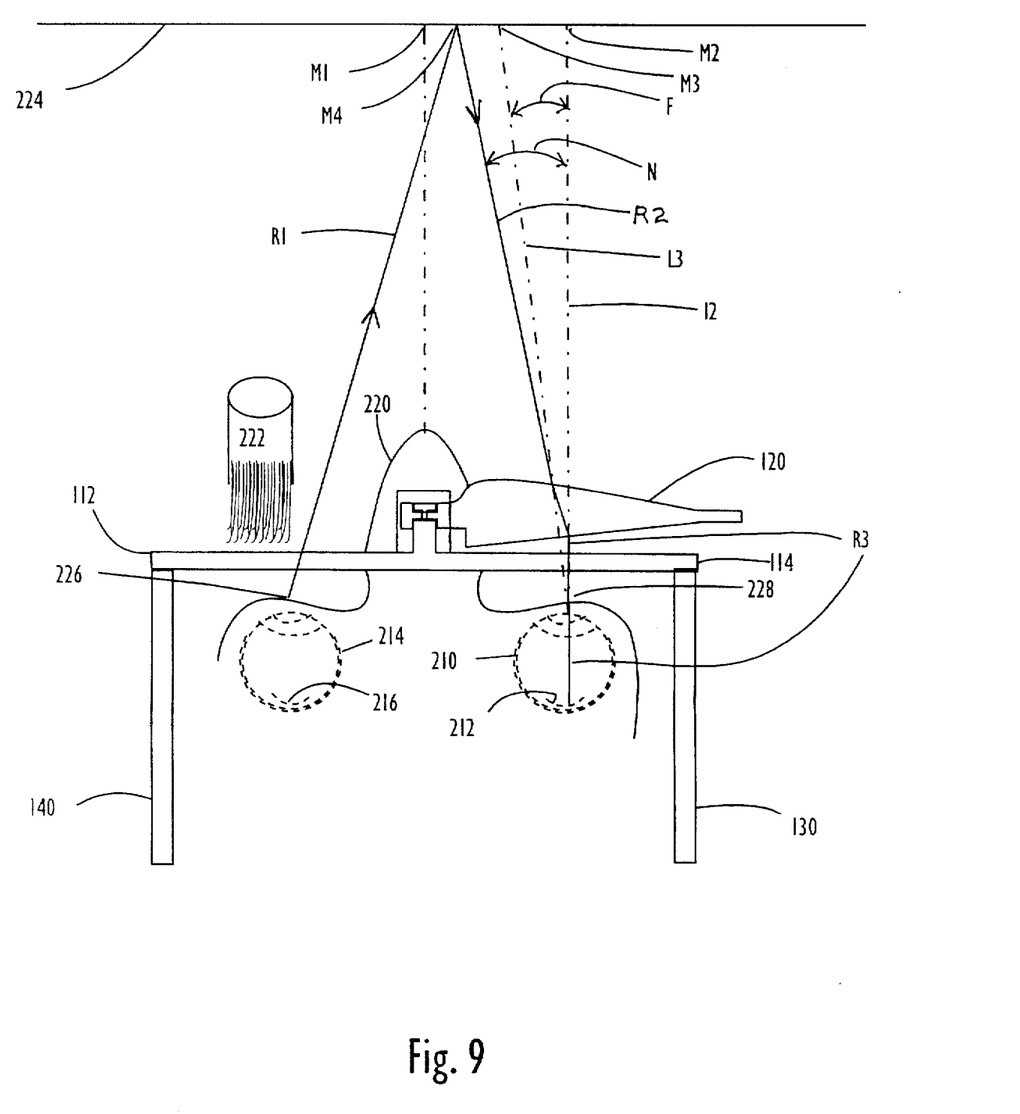
FIG. 9 is a top plan view of the preferred frame assembly in use for bending and magnifying an image of left side of the face, for viewing through the right eye.

FIG. 9 shows frame assembly 100 in use while the wearer applies makeup to facial area 226, directly under left eye 214, using mascara brush 222. The wearer places lens 120 in right eye frame 114 to observe the left side of the face through mirror 224 while looking through right eye 210. In FIG. 8, the wearers's face is approximately one half (0.5) meters from mirror 224. Light ray portion R1, reflected from facial area 226 travels to mirror 224 and a resulting ray portion R2 reflects from mirror 224 onto lens 120. Lens 120 bends ray portion R2 resulting in ray portion R3 which is incident on fovea 212 of the left eye. Ray portion R3 is substantially normal to the surface of mirror 224, and is substantially normal to right eye frame 114.

Each of left eye frame 112 and right eye frame 114 defines an open, concave shape (a U-shape) facing away from the top of the frame assembly 100. Because horizontal support 110 extends only along the top of the frame assembly 100, not the bottom, the wearer has easy access to her eyes using a tool such as a mascara brush.

In FIGS. 8 and 9, the wearer's eyes 214 and 210 are both approximating primary graze, meaning the both eyes are looking approximately straight ahead toward mirror 224.

Thus, as shown if FIG. 8, the preferred method includes positioning the face in front of a mirror. Lens 120 acts to bend ray light R2, reflected from facial area 228 and mirror 224, such that the bent light ray portion R3 defines an angle substantially normal to the surface of the mirror. Eye 214 acts to view ray portion R3.

The preferred frame assembly also facilitates application of eye drops, contact lens, and allows removal of eye lashes or eyebrow hair.

The invention may be practiced with a light bending element that does not make the bent light substantially normal to the mirror but instead bends the light to substantially facilitate viewing of one side of the face with the eye from the other side of the face, by reducing the amount that viewing eye must move to look over the other side of the face. For example, referring to FIG. 8, if ray portion R2 has an angle N relative to line L2 (which has an angle normal to mirror 224), benefit may be achieved by bending the reflected light to produce bent light having an angle no more than 0.5N relative to the angle normal to mirror 224. Preferably, the bending step will produce light having an angle of no more than 0.2N relative to the angle normal to mirror 224.

For another example, referring to FIG. 8, mirror location M2 is directly in from of eye 214, meaning the mirror location M2 is the mirror location having minimum distance from eye 214. Mirror location M1 is directly in front of nose 220, meaning the mirror location M1 is the mirror location having the minimum distance from nose 220. Mirror location M3 is a mirror location midway between locations M1 and M2. Mirror location M4 is a mirror location that reflects light from facial area 228 to lens 120. Line L2 is normal to location M2. Line L3 is defined by location M3 and a point defined by the intersection of L2 with eye 214. N is the angle defined by line L2 and ray portion R2. Angle N is the amount of bending necessary to make ray R3 normal to mirror 224. The invention may be practiced with a light bending element that bends the light by at lest the angle F, which is the angle defined by the lines L2 and L3.

Instead of a prism, the light bending element maybe a tilted mirror or a tilted, non-prismatic, lens.

Because human eyes must move synchronously, prior art methods of having one eye view the other in a mirror required the viewer to overcome a natural tendency of the viewing eye to look at itself. In the prior art, the viewed eye was required to look away from itself so that the viewing eye could cross over to look at the viewed eye, which was troublesome and a potential source of eye strain for some individuals. With the preferred frame assembly and method of the present invention, however, this problem is eliminated because both eyes may look straight ahead.

Further, with the preferred frame assembly and method of the present invention, binocularity may be achieved because the viewed eye is viewed by itself as well as the other eye, allowing the brain to superimpose the signals from each eye to achieve depth perception.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicants' general inventive concept. The invention is defined in the following claims.

What is claimed is:

1. A frame assembly configured to allow a person to view the face through a mirror to apply a substance to the face, the mirror defining a normal angle that is normal to the mirror, the face having a nose delineating a first face half with a first eye, and a second face half with a second eye, the frame assembly comprising:

a support;

a securer for securing the support to the head of the person; and an optical element for receiving a light signal reflected from both the second face half and the mirror, and acting on the light signal with a prism diopter of at least 4, to bend the light signal and project the light signal onto the fovea of the first eye, wherein the optical element is coupled to the support allowing movement of the optical element from a first position in optical registration with the first eye and a second position out of optical registration with the first eye.

2. The frame assembly of claim 1 wherein the second position is in optical registration with the second eye.

3. The frame assembly of claim 1 wherein the optical element acts with a power diopter of at least +0.50.

4. The frame assembly of claim 1 wherein the optical element acts with a power diopter in the range +0.50 and +9.00.

5. The frame assembly of claim 1 wherein the optical element acts with a prism diopter in the range 6 to 8.

6. The frame assembly of claim 5 wherein the optical element acts with a power diopter of at least +0.50.

7. The frame assembly of claim 5 wherein the optical element acts with a power diopter in the range +0.50 and +9.00.

8. The frame assembly of claim 1 wherein the optical element acts with a power diopter of at least +0.50.

9. The frame assembly of claim 1 wherein the optical element acts with a power diopter in the range +0.50 and +9.00.

10. The frame assembly of claim 1 wherein the optical element includes a lens.

11. The frame assembly of claim 1 wherein the optical element includes a prism.

12. In a system including a mirror, the mirror defining a normal angle that is normal to the mirror, a method for applying a substance to a face having a nose delineating a first face half with a first eye, and a second face half with a second eye, the method comprising the steps of:

positioning the face in front of the mirror;

receiving a light signal reflected from both the second half of the face and the mirror, a first direction of the light signal defining an angle N relative to the normal angle;

bending the light signal such that a second direction of the light signal has an angle of no more than 0.5N relative to the normal angle;

viewing into the second direction of the light signal with the first eye; and applying the substance to an area of the face in proximity to the second eye.

13. The method of claim 12 wherein the bending step includes bending such that the second direction has an angle of no more than 0.2N relative to the normal angle.

14. The method of claim 12 wherein the bending step includes bending such that the second direction has an angle substantially normal to the surface of the mirror.

15. The method of claim 12 further including the steps of receiving a second light signal reflected from both the first half of the face and the mirror, a first direction of the second light signal defining the angle N relative to the normal angle;

bending the second light signal such that a second direction of the second light signal has an angle of no more than 0.5N relative to the normal angle;

viewing into the second direction of the second light signal with the second eye; and applying the substance to an area of the face in proximity to the first eye.

16. The method of claim 15 wherein the step of bending a second light signal includes bending such that the second direction of the second light signal has an angle substantially normal to the surface of the mirror.

17. The method of claim 12 wherein the step of receiving includes receiving light from a facial area under the second eye.

18. The method of claim 12 further including the steps of moving an optical element;

receiving a second light signal reflected from both the first half of the face and the mirror, a first direction of the second light signal defining the angle N relative to the normal angle;

using the optical element to bend the second light signal such that a second direction of the second light signal has an angle of no more than 0.5N relative to the normal angle;

viewing into the second direction of the second light signal with the second eye; and applying the substance to an area of the face in proximity to the first eye.

19. In a system including a mirror, a method for applying a substance to a face having a nose delineating a first face half with a first eye, and a second face half with a second eye, the method comprising the steps of receiving a first light signal reflected from both the second face half and the mirror;

acting on the first light signal with a prism diopter of at least 4, to bend the first light signal and project the first light signal onto the fovea of the first eye;

applying the substance to the second face half;

subsequently, receiving a second light signal reflected from both the first face half and the mirror;

acting on the second light signal with a prism diopter of at least 4, to bend the second light signal and project the second light signal onto the fovea of the second eye; and applying the substance to the first face half.

20. The method of claim 19 wherein the step of acting on the first light signal includes acting with a power diopter of at least +0.50.

21. The method of claim 19 wherein the step of acting on the first light signal includes acting with a power diopter in the range +0.50 and +9.00.

22. The method of claim 19 wherein the step of acting on the first light signal includes acting with a prism diopter in the range 6 to 8.

23. The method of claim 22 wherein the step of acting on the first light signal includes acting with a power diopter of at least +0.50.

24. The method of claim 22 wherein the step of acting on the first light signal includes acting with a power diopter in the range +0.50 and +9.00.

25. The method of claim 19 wherein the step of acting on the first light signal includes acting with a power diopter of at least +0.50.

26. The method of claim 19 wherein the step of acting on the first light signal includes acting with a power diopter in the range +0.50 and +9.00.

* * * * *

UNITED STATES PATENT AND TRADEMARK OFFICE
CERTIFICATE OF CORRECTION

PATENT NO. : 5,815,234
DATED : Sep. 29, 1998
INVENTOR(S) : Dileo

It is certified that error appears in the above-identified patent and that said Letters Patent is hereby corrected as shown below:

The title page should be deleted to appear as per attached title page.

Please delete drawing sheets 1 - 6 and substitute drawing sheets 1 - 6 as per attached.

Signed and Sealed this

Twenty-eighth Day of September, 1999

Attest:

Q. TODD DICKINSON

*Attesting Officer*  *Acting Commissioner of Patents and Trademarks*

United States Patent [19]

Dileo

[11] Patent Number: 5,815,234
[45] Date of Patent: Sep. 29, 1998

[54] APPARATUS AND METHOD FOR VIEWING A SURFACE THROUGH A MIRROR

[76] Inventor: Frank Dileo, P.O. Box 1668, Bridgehampton, N.Y. 11932

[21] Appl. No.: 813,216

[22] Filed: Mar. 7, 1997

[51] Int. Cl.$^6$ .................................................. G02C 9/02
[52] U.S. Cl. .................................................. 351/59
[58] Field of Search .............................. 351/41, 59, 159, 351/169

[56] References Cited

U.S. PATENT DOCUMENTS

| | | | |
|---|---|---|---|
| 3,495,898 | 2/1970 | Vecchio | 351/59 |
| 3,840,294 | 10/1974 | Knier | 351/59 |
| 5,452,030 | 9/1995 | Feinbloom | 351/175 |
| 5,561,481 | 10/1996 | Dileo et al. | 351/59 |

*Primary Examiner*—Huy Mai
*Attorney, Agent, or Firm*—Jerome D. Jackson

[57] ABSTRACT

A frame assembly for applying makeup to presbyopic eyes. The assembly includes a single prismatic lens that rotates between a position in optical registry with the wearer's left eye and another position in optical registry with the wearer's right eye.

26 Claims, 6 Drawing Sheets